United States Patent [19]
Shellhause

[11] 3,714,780
[45] Feb. 6, 1973

[54] VEHICLE BRAKE CONTROL MODULE AND MOUNTING MEANS

[75] Inventor: Ronald L. Shellhause, Vandalia, Ohio

[73] Assignee: General Motors Corporation, Detroit, Mich.

[22] Filed: June 30, 1971

[21] Appl. No.: 158,476

[52] U.S. Cl. ............... 60/54.6 R, 248/27, 248/223
[51] Int. Cl. ............................................. F15b 7/00
[58] Field of Search .......... 60/54.5, 54.6 P, 54.6 R; 248/223, 224, 27; 49/261, 463

[56] References Cited

UNITED STATES PATENTS

| | | | |
|---|---|---|---|
| 2,018,023 | 10/1935 | Kliesrath | 60/54.6 R |
| 3,002,556 | 10/1961 | Tourville | 49/261 |
| 1,764,762 | 6/1930 | Spreen | 49/463 |
| 3,013,393 | 12/1961 | Erickson | 60/54.5 R |
| 2,687,015 | 8/1954 | Edwards | 60/54.6 R |
| 3,121,480 | 2/1964 | Goettl et al. | 49/463 |

*Primary Examiner*—Martin P. Schwadron
*Assistant Examiner*—A. M. Zupcic
*Attorney*—W. E. Finken et al.

[57] ABSTRACT

A vehicle brake control module comprising a bracket to which the brake booster and master cylinder are mounted on one side and the brake pedal lever is pivotally mounted on the other side, the pedal lever being connected to operate the booster and master cylinder when the pedal is depressed. The module is adapted to be easily installed through an aperture in a suitable vehicle panel such as the firewall, the bracket closing and sealing the aperture.

5 Claims, 2 Drawing Figures

PATENTED FEB 6 1973

3,714,780

INVENTOR.
Ronald L. Shellhause
BY
O. D. McGraw
ATTORNEY

VEHICLE BRAKE CONTROL MODULE AND MOUNTING MEANS

The invention relates to a brake control system and, more particularly, to one assembled as a module and installed in position through a vehicle panel aperture. It further includes the particular mounting arrangement for the module in relation to the panel. By assembling the brake pedal lever, the brake booster and the master cylinder on a common mounting bracket and handling the resultant subassembly as a unit, the subassembly may be fully pretested and adjusted prior to installation in the vehicle. Installation is made in the typical vehicle by inserting the module through the engine compartment; passing the brake pedal through the firewall panel aperture; positioning the lower side of the module bracket about the lower edge of the aperture; pivoting the module, including the bracket, about the aperture lower edge to close the aperture and bring the upper portion of the bracket into position to be fastened to the firewall panel; and fastening the bracket to the firewall panel, preferably by a simplified arrangement such as the use of one bolt assembly. This arrangement lends itself to quick, accurate assembly without requiring a person to work underneath the instrument panel while performing connecting and adjusting operations on the brake pedal, the push rod, switches, etc.

Figure 1:
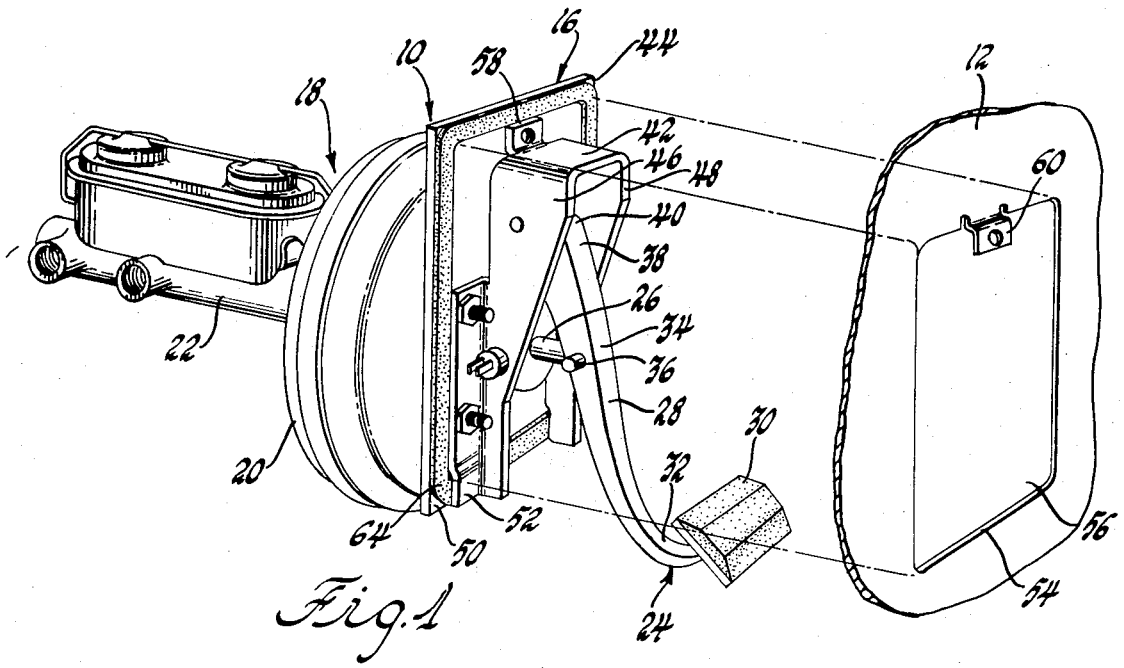
FIG. 1 is an isometric view, with parts broken away, of a vehicle brake control mechanism embodying the invention, the module being separated from the panel.
Figure 2:
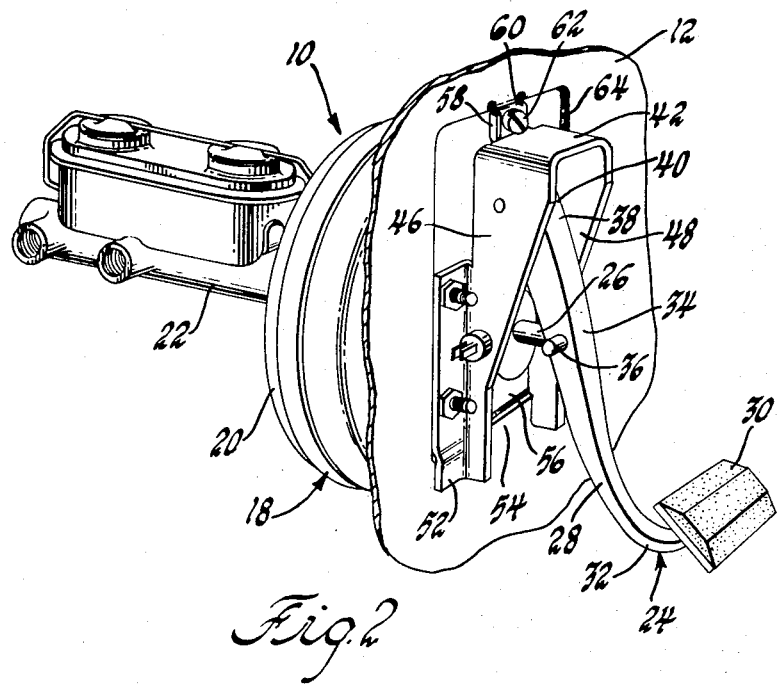
FIG. 2 is an isometric view similar to FIG. 1, with parts broken away, the module being illustrated in the installed position.

The brake control module 10 is illustrated as being mounted on the vehicle panel 12, usually the vehicle firewall. The module includes a mounting bracket 16, a brake system operator 18 which is illustrated as being composed of a brake booster 20 and a master cylinder assembly 22. The operator may be any of several other known types. The brake system operator 18 is mounted on one side of the mounting bracket 16 so that it normally projects into the vehicle compartment forward of the firewall panel 12. The module also includes the brake pedal assembly 24 and the push rod 26. The brake pedal assembly 24 includes a brake lever or arm 28 on one end of which is mounted a pedal or foot pad 30. The end of the lever on which pedal 30 is mounted provides a force-receiving section 32. A center portion 34 of the lever 28 provides a force-applying section to which one end of the push rod 26 is attached by a pivot connection 36. The other end of lever 28 includes a pivot section 38, a portion of which forms a part of the brake pedal lever hinge assembly 40.

The support bracket 16 has an upper plate section 42 extending from the main mounting bracket body 44 and formed to provide part of the hinge assembly 40. Side plates 46, 48 are suitably formed as a part of the mounting bracket 16 to provide strength to the bracket and as parts of the hinge assembly 40, as described below. In the construction illustrated, the side plates 46 and 48 are folded from the upper plate 42 and suitably secured to the main mounting bracket body 44. The mounting bracket has tangs 50 and 52, the tang 50 being illustrated as being the lower edge of the mounting bracket body 44, and tangs 52 being spaced therefrom and formed by the lower ends of side plates 46 and 48. The tangs 50 and 52 receive therebetween the portion 54 of the firewall panel forming the edge of the panel aperture 56 through which the module 10 extends. There may be provided more tangs than those shown in accordance with design requirements. Opposite the tangs 50 and 52 is located suitable tab means 58 extending in the plane of the mounting bracket body 44 and over an upper portion 60 of the panel 12 adjacent aperture 54. In the preferred construction, a single tab 58 is desirable. This tab provides for the fastening of the upper part of the mounting bracket to the panel 12 by suitable fastening means, such as the bolt assembly 62.

It can be seen that the module is capable of being installed as a unit from the forward side of panel 12 by first inserting the pedal 30 through aperture 56, moving the module rearwardly and downwardly to engage tangs 50 and 52 over the portion 54 of panel 12, then pivoting the module about this portion of panel 12 to bring tab means 58 into position against the upper portion 60 of panel 12. The bolt assembly 62 is then inserted and tightened, thus completing the installation of the module. A compressible seal or gasket 64 is secured to body 44 so that it sealingly encircles the aperture 56 and is compressed to tightly seal between the body 44 and the panel 12 when bolt assembly 62 is tightened. This has distinct advantages of assembly and subassembly pretest capacity, as well as advantages in removal and replacement of components.

What is claimed is:

1. A vehicle brake control module for installation through an apertured vehicle panel and comprising:
   a mounting bracket having secured thereto a brake system operator on one side and a pivotal brake pedal lever on the other side, and means for removably attaching the mounting bracket to the apertured vehicle panel so that the mounting bracket fills and closes the aperture with the brake system operator extending on one panel side and the brake pedal lever extending on the other panel side, said brake pedal lever and said brake system operator being connected by means extending through said bracket for operation of said brake system operator by pivotal movement of said brake pedal lever toward and away from said brake system operator.

2. The vehicle brake control module of claim 1, said mounting bracket removable attaching means comprising displaced tang means adjacent one edge portion thereof and adapted to fit on both sides of the panel aperture and fastening tab means adjacent another edge portion thereof for receiving a securing fastener therethrough and securing said bracket to the panel.

3. A vehicle brake control module for installation through and mounting on an apertured vehicle firewall panel and comprising:
   a brake system operator adapted to provide fluid pressures to vehicle brakes for actuation of same, a brake pedal lever having means connecting it to the brake system operator for control thereof by the vehicle driver,
   and a mounting bracket having said brake system operator mounted on one side thereof and said brake pedal lever mounted on the other side thereof, first retention means on one edge of said mounting bracket providing slot means for receiving an edge of the firewall panel aperture therein to hold said mounting bracket on said panel in limited pivotal movement relation about a pivot line formed by the aperture edge, and second retention means on an opposite edge of said mounting bracket for securing said mounting bracket to the firewall panel after said bracket is pivoted about the aperture edge pivot line to a position closing the firewall panel aperture.

4. The vehicle brake control module of claim 3, said second retention means being a one-point tab and bolt fastener requiring only one bolt fastener to hold said module in position on the firewall panel.

5. The vehicle brake control module of claim 3 further including a compressible sealing gasket on said mounting bracket for sealing encirclement of the firewall panel aperture and on the mounting bracket side wherein said gasket is compressed when said second retention means is tightly fastened to seal the aperture.

* * * * *